United States Patent [19]

Liu

[11] Patent Number: 5,874,785
[45] Date of Patent: Feb. 23, 1999

[54] KEYLESS MOTOR VEHICLE STARTING SYSTEM

[75] Inventor: Chunyan Liu, Montville, N.J.

[73] Assignee: Continocean Tech Inc., Montville, N.J.

[21] Appl. No.: 984,834

[22] Filed: Dec. 4, 1997

[51] Int. Cl.$^6$ ................................................. B60R 25/04
[52] U.S. Cl. ...................... 307/10.5; 180/287; 123/179.2
[58] Field of Search ................................... 307/10.1–10.6; 180/287; 340/425.5, 426, 825.69, 825.22, 825.3–825.32, 825.34, 825.54; 123/179.1–179.4

[56] References Cited

U.S. PATENT DOCUMENTS

4,236,594  12/1980  Ramsperger ............................ 307/10.2
4,674,454  6/1987  Phairr ...................................... 123/179.2

*Primary Examiner*—Richard T. Elms

[57] ABSTRACT

A keyless motor vehicle starting system to replace a conventional ignition lock and ignition key of a motor vehicle. The system comprises a portable wireless transmitter and a receiver/controller board which is installed deeply inside the motor vehicle behind a steering column cover or cluster cover of the motor vehicle. The portable wireless transmitter has a transmitter integrated-circuit chip loaded with a computer program to implement a process to generate a power-code and a starter-code and controls the states of a motor vehicle by sending a radio-frequency-modulated power-code and starter code. The receiver/controller board has a receiver integrated-circuit chip loaded with a computer program to implement a process to detect the power-code and the starter-code and control a plurality of switches for switching among the OFF, ACC, START and RUN states of a motor vehicle.

15 Claims, 4 Drawing Sheets

KEYLESS MOTOR VEHICLE STARTING SYSTEM

BACKGROUND OF THE INVENTION

This invention relates to a keyless motor vehicle starting system with an anti-theft feature, more specifically, to a motor vehicle starting which uses software-programmed intergrated-circuit (IC) chips and radio frequency (RF) circuits to replace a conventional ignition lock and ignition key of a motor vehicle by using a circuit structure which is consistent with the existing industrial standards and avoids changing significatly the existing vehicle circuits and allows simple "plug-in" when the invented system is installed on an existing motor vehicle, and accordingly to the manner of operation of a vehicle with the invented system installed.

CROSS-REFERENCE TO RELATED APPLICATION

This application is related to application Ser. No. 08/653,496, filed on May 24, 1996, now U.S. Pat. No. 5,689,142, granted on Nov. 18, 1997.

In existing motor vehicles an ignition lock with an ignition key is always used to protect motor vehicles engines.

However, the ignition lock with the ignition key has failed to protect motor. vehicles satisfactorily from being stolen since an ignition lock can be relatively easily broken and bypassed and the motor vehicle can be started by an unauthorized person without using an ignition key. Many anti-theft devices have been designed to overcome the problem. These devices provide extra protection for motor vehicles in addition to the existing ignition lock. Although some of the anti-theft devices provide effective protection for motor vehicles, a driver always has to carry and operate both an anti-theft device controller and an ignition key and manufacturers and service-providers have to manufacture and install both anti-theft devices and ignition locks.

On the other hand, some remote vehicle-starting devices have been disclosed to act as an auxiliary addition to the conventional ignition lock/key starting system. These existing devices do not intend to replace the conventional ignition lock and ignition key, and have to use complicated circuits and therefore are expensive to manufacture. Two vehicle-starting systems installed in one car also add extra manufacturing cost. These devices are also inconvenient for drivers since they have to carry and operate both ignition keys and remote-starting controllers. In addition, they do not provide needed anti-theft features.

In a related application filed by the same applicant with application Ser. No. 08/653,496 filed on May 24, 1996 and now U.S. Pat. No. 5,689,142 granted on Nov. 18, 1997, a keyless motor vehicle starting system is disclosed to overcome the drawbacks in the prior art. However, when the keyless motor vehicle starting system disclosed in the patent is installed on an existing motor vehicle, the existing vehicle circuits have to be changed significantly to allow the new motor vehicle starting system to function properly. This severely restricts the application of the keyless starting system to the existing motor vehicles. In addition, the keyless motor vehicle starting system in the patent fails to use the most advanced technologies in integrated-circuits, such as microprocessor, digital signal processor (DSP), application-specific-integrated-circuit (ASIC) or programmable-logic-array, and therefore the manufacturing cost of the keyless motor vehicle starting system is too high to be suitable for motor vehicles sold to consumers. A software implementation of the keyless motor vehicle starting system disclosed in the patent is impossible because of the circuit design restrictions specified in the patent and therefore its development is relatively difficult and its reliability is relatively low.

An object of this invention is to use an electronic device to replace the conventional ignition lock and ignition key and to provide a reliable, highly secure, user-friendly and low-cost keyless motor vehicle starting system which is consistent with the existing industrial standards and avoids changing significantly the existing vehicle circuits and allows simple "plug-in" when the invented system is installed on an existing motor vehicle.

Another object of this invention is to use an integrated-circuit (IC) chip, such as a microprocessor, digital signal processor (DSP), application-specific-integrated-circuit (ASIC) or programmable-logic-array to reduce the cost of the keyless motor vehicle starting system.

Another object of this invention is to allow the software implementation of the keyless motor vehicle starting system to make its development much more efficient and its reliability much higher than the techniques disclosed in the prior art.

Another object of this invention is to use a computer program coupled with the circuit in the system to avoid having to detect engine-running conditions and avoid using a feed-back-control circuit to deenergize the motor starter and therefore overcome the problems of lower reliability and higher manufacturing cost associated with the existing remote-starting devices.

PRIOR ART

There exist many patents which disclose methods and techniques for adding anti-theft devices or adding remote starting devices to existing vehicle-starting systems without changing the conventional ignition lock/key starting system.

Anti-theft features are added to the conventional ignition lock/key starting systems in, for example, U.S. Pat. No. 5,287,006, U.S. Pat. No. 5,449,957, and U.S. Pat. No. 5,453,730. These devices disable engine-starting systems using remote-controlled switches. They do not provide any starting capabilities without using ignition keys.

Remote starting features are added to the conventional ignition lock/key starting systems in U.S. Pat. No. 3,054,904, U.S. Pat. No. 3,124,118, U.S. Pat. No. 3,553,472, U.S. Pat. No. 3,577,164, U.S. Pat. No. 3,603,802, U.S. Pat. No. 3,657,720, U.S. Pat. No. 3,790,806 and U.S. Pat. No. 4,928,778. These devices provide an auxiliary remote starting feature and do not intend to replace the conventional ignition lock/key starting systems. They also do not provide any anti-theft features. In addition, a common problem with these devices is that they all need to detect the engine-running condition and de-energize the motor starter once an engine-running condition is detected. These engine-running detection and feedback-control circuits are not reliable and are complicated and expensive to manufacture.

In a related application filed by the same applicant with application Ser. No. 08/653,496 filed on May 24, 1996 and now Pat. No. 5,689,142 granted on Nov. 18, 1997, a keyless motor vehicle starting system is disclosed to overcome the drawbacks in the prior arts. However, when the keyless motor vehicle starting system disclosed in the patent is installed on an existing motor vehicle, the existing vehicle circuits have to be changed significantly to allow the new motor vehicle starting system to function properly. This severely restricts the application of the keyless starting system to the existing motor vehicles. In addition, the keyless motor vehicle starting system in the patent fails to use the most advanced technologies in integrated-circuits (IC), such as microprocessor, digital signal processor (DSP), application-specific-integrated-circuit (ASIC) and programmable-logic-array and therefore the manufacturing cost of the keyless motor vehicle starting system is too high to be suitable for motor vehicles sold to consumers. A software implementation of the keyless motor vehicle starting system disclosed in the patent is impossible because of the circuit design restrictions specified in the patent and therefore its development is relatively difficult and its reliability is relatively low.

SUMMARY OF THE INVENTION

The goal of this invention is to use integrated-circuits, such as microprocessor, digital signal processor (DSP), application-specific-integrated-circuit (ASIC) or programmable-logic-array to replace the conventional ignition lock and ignition key and to provide a reliable, highly secure, user-friendly and low-cost motor vehicle starting system which is consistent with the existing industrial standards and avoids changing significantly the existing vehicle circuits and allows simple "plug-in" when the invented system is installed on an existing motor vehicle. In addition, a software implementation of the keyless motor vehicle starting system is used to make the development of the keyless starting system much more efficient and its reliability much higher than the techniques disclosed in the prior art.

The keyless vehicle starting system in this invention comprises a portable wireless transmitter and a receiving/controlling board which is installed deep inside a vehicle, preferably behind the steering column cover or cluster cover of the vehicle. The portable wireless transmitter includes a transmitter integrated-circuit (IC) chip, a radio-frequency (RF) modulator, a battery and two normal-off button switches: a power-code switch and a starter-code switch. The transmitter IC chip performs the functions of generating a power-code and generating a starter-code. The power-code switch is used to turn on and off the power-code generating function of the transmitter IC chip. The starter-code switch is used to turn on and off the starter-code generating function of the transmitter IC chip.

The receiving/controlling board has an RF demodulator, a receiver integrated-circuit (IC) chip, an ACC-circuit switch, a starting-circuit switch, a first ignition-circuit switch and a second ignition-circuit switch. The receiver IC chip performs the functions of detecting the power-code and starter-code, and generating output signals to control the ACC-circuit switch, the starting-circuit switch, the first ignition-circuit switch and the second ignition-circuit switch. The receiver IC chip also maintains an OFF-state, an ACC-state, a START-state and a RUN-state. When the starter-code from the portable wireless transmitter is properly detected by the receiver IC chip, the receiver IC chip switches its state to the START-state. When the starter-code from the portable wireless transmitter disappears, the receiver IC chip switches its state from the START-state to the RUN-state. Whenever the power-code switch on the portable wireless transmitter is pressed once and the power-code is detected by the receiver IC chip, the receiver IC chip switches its state from the OFF-state to the ACC-state, or from the ACC-state to the OFF-state, or from the RUN-state to the OFF-state. In the OFF-state, the ACC-circuit switch, starting-circuit switch, first ignition-circuit switch and second ignition-circuit switch are all turned off. In the ACC-state, the ACC-circuit switch is turned on and the starting-circuit switch, first ignition-circuit switch and second ignition-circuit switch are turned off. In the START-state, the starting-circuit switch and the first ignition-circuit switch are turned on while the ACC-switch and the second ignition-circuit switch are turned off. In the RUN-state, the ACC-circuit switch, the first ignition-circuit switch and the second ignition-circuit switch are turned on while the starting-circuit switch is turned off.

The receiving/controlling board is used to replace an ignition switch in a conventional motor vehicle. The portable wireless transmitter is used to replace an ignition key in a conventional motor vehicle. To start a motor vehicle equipped with the keyless starting system in this invention, the starter-code switch on the portable wireless transmitter is pressed and held until the engine of the vehicle is started. To stall the engine of the motor vehicle when the engine is running, the driver of the vehicle needs to press the power-code switch momentarily. To turn on the ACC (power supply for radio, air conditioner, fan, etc.), the driver needs to press the power-code momentarily.

A feature of keyless door-opening is also added to the invention using a method similar to what is described in the previous paragraphs.

DETAILED DESCRIPTION

Figure 1:
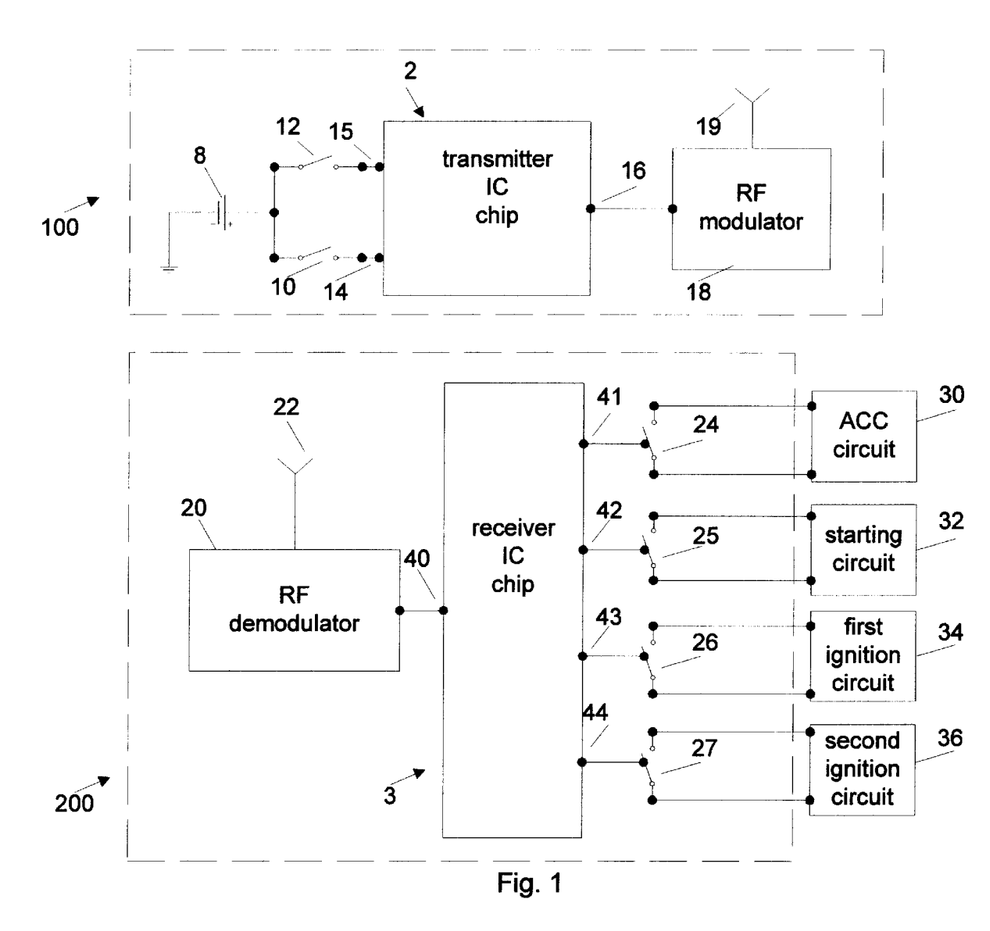
FIG. 1 is a schematic diagram illustrating one embodiment of a system employing the keyless starting device of the present invention.

Referring to FIG. 1, a conventional motor vehicle has an ACC-circuit 30, a starting-circuit 32, a first ignition-circuit 34 which is energized when the engine is being started and running, and a second ignition-circuit 36 which is energized when the engine is running and not energized when the engine is being started. The ignition switch in a conventional motor vehicle is replaced by the keyless starting device disclosed in this invention. In addition to the components from the conventional motor vehicle, the keyless starting system includes two major parts: a portable wireless transmitter 100, and a receiver/controller board 200.

The portable wireless transmitter 100 comprises a battery 8, a power-code switch 10, a starter-code switch 12, a transmitter integrated-circuit (IC) chip 2, a radio frequency (RF) modulator 18 and an antenna 19. The transmitter IC chip 2 has two input ports 14 and 15 which are connected to the power-code switch 10 and the starter-code switch 12 respectively. The transmitter IC chip 2 has an output port 16 which is connected to the RF modulator 18. The transmitter IC chip 2 can be a microprocessor, a digital signal processor, an application-specific-integrated-circuit (ASIC) or a programmable-logic-array and can be programmed to implement desired functions.

The receiver/controller board 200 is preferably installed deep inside the motor vehicle behind the steering column cover or cluster cover, and includes an antenna 22, an RF demodulator 20, a receiver integrated-circuit (IC) chip 3, an ACC-circuit switch 24, a starting-circuit switch 25, a first ignition-circuit switch 26 and a second ignition-circuit switch 27. The receiver IC chip 3 has an input port 40 which is connected to the RF demodulator 20. The receiver IC chip 3 has an output port 41 connected to the ACC-circuit switch 24, an output port 42 connected to the starting-circuit switch 25, an output port 43 connected to the first ignition-circuit switch 26, and an output port 44 connected to the second ignition-circuit switch 27. The receiver IC chip 3 can be a microprocessor, a digital signal processor, an application-specific-integrated-circuit (ASIC) or a programmable-logic-array and can be programmed to implement desired functions. The ACC-circuit switch 24, the starting-circuit switch 25, the first ignition-circuit switch 26 and the second ignition-circuit switch 27 are connected to the ACC-circuit 30, the starting-circuit 32, the first ignition-circuit 34 and the second ignition-circuit 36 respectively and are used to energize or de-energize these vehicle circuits. The ON-OFF state of the switches is controlled by a state-machine inside the receiver IC chip 3 with an OFF-state, an ACC-state, a START-state and a RUN-state.

The transmitter IC chip 2 generates a power-code to control the ACC-circuit switch 24, the first ignition-circuit switch 26 and the second ignition-circuit switch 27. The transmitter IC chip 2 generates a starter-code to control the starting-circuit switch 25 and the first ignition-circuit switch 26. The power-code switch 10 is preferably a push-button switch and turns on the power-code generating function of the transmitter IC chip 2 when the switch 10 is pressed. The starter-code switch 12 is preferably a push-button switch and turns on the starter-code generating function of the transmitter IC chip 2 when the switch 12 is pressed. Both the power-code and the starter-code generated by the transmitter IC chip 2 are a series of 0 and 1's which are encoded according to a certain rule. For example, the power-code and the starter-code can be an error-detecting code, or a pseudo-noise (PN) code. It is noted that only one of the switches 10 and 12 should be pressed at a time. When neither of the switches 10 and 12 is pressed, no output is generated by the transmitter IC chip 2 and the RF modulator 18. The output of the transmitter IC chip 2 is sent to the RF modulator 18. The RF signal from the RF modulator 18 is fed into the antenna 19 to be transmitted to the air.

The RF signal from the portable wireless transmitter is received by the antenna 22 and demodulated by the RF demodulator 20 which then generates a demodulated signal. The demodulated signal from the RF demodulator 20 should be a starter-code, or a power-code, or none of them, depending on which push-button switch on the portable wireless transmitter 100 is pressed. The demodulated signal is fed into the receiver IC chip 3. If the demodulated signal is a power-code and the ACC-circuit switch 24 is on, the receiver IC chip 3 turns off all the switches. If the demodulated signal is a power-code and the ACC-circuit switch 24 is off, the receiver IC chip 3 turns on the ACC-circuit switch 24 and turns off all other switches. If the demodulated signal is a starter-code, the receiver IC chip 3 turns on the starting-circuit switch 25 and the first ignition-circuit switch 26 and turns off the other switches. If the demodulated signal is neither a power-code nor a starter-code and the starting-circuit switch 25 is on, the receiver IC chip turns on the ACC-circuit switch 24, the first ignition-circuit switch 26 and the second ignition-circuit switch 27. If the demodulated signal is neither a power-code nor a starter-code and the starting-circuit switch 25 is off, the receiver IC chip maintains the ON-OFF states of all the switches unchanged.

Figure 2:
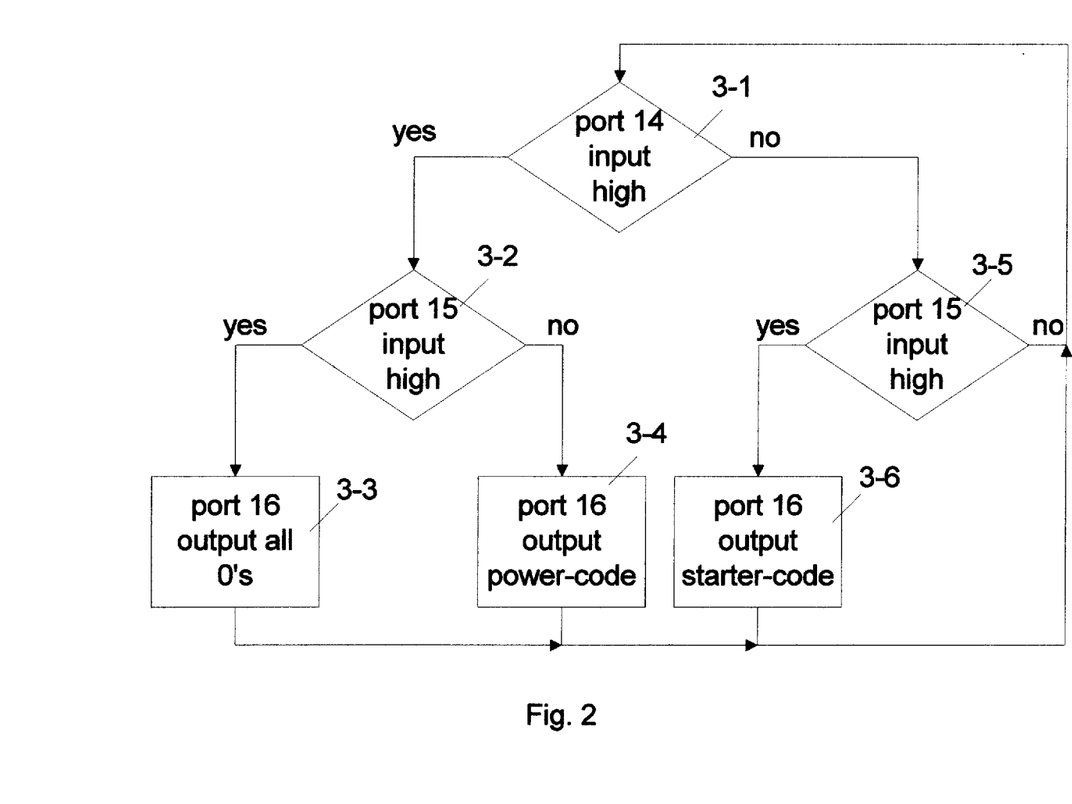
FIG. 2 illustrates a logic flow chart of the software loaded into the transmitter IC chip to implement the functions of generating a power-code and generating a starter-code.

FIG. 2 illustrates a logic flow chart of the software loaded into the transmitter IC chip 2 to implement the functions of generating the power-code and the starter-code. The software implements a process to perform these tasks. Starting from the beginning of the process, the port 14 input signal at step 3-1 is checked. If the port 14 input signal at step 3-1 is high, then the port 15 input signal is checked at step 3-2. If the port 15 input signal at step 3-2 is high, the port 16 outputs all 0's at step 3-3. If the port 15 input signal at step 3-2 is low, the port 16 at step 3-4 outputs the power-code, which is a series of 0 and 1's encoded according to a first rule. If the port 14 input signal at step 3-1 is low, the port 15 input signal at step 3-5 is checked. If the port 15 input signal at step 3-5 is high, the port 16 at step 3-6 outputs the starter code, which is a series of 0 and 1's encoded according to a second rule. After completing the tasks at steps 3-3, 3-4 or 3-6, the transmitter IC chip 2 goes back to the beginning of the process at step 3-1 and starts another cycle of the process.

Figure 3:
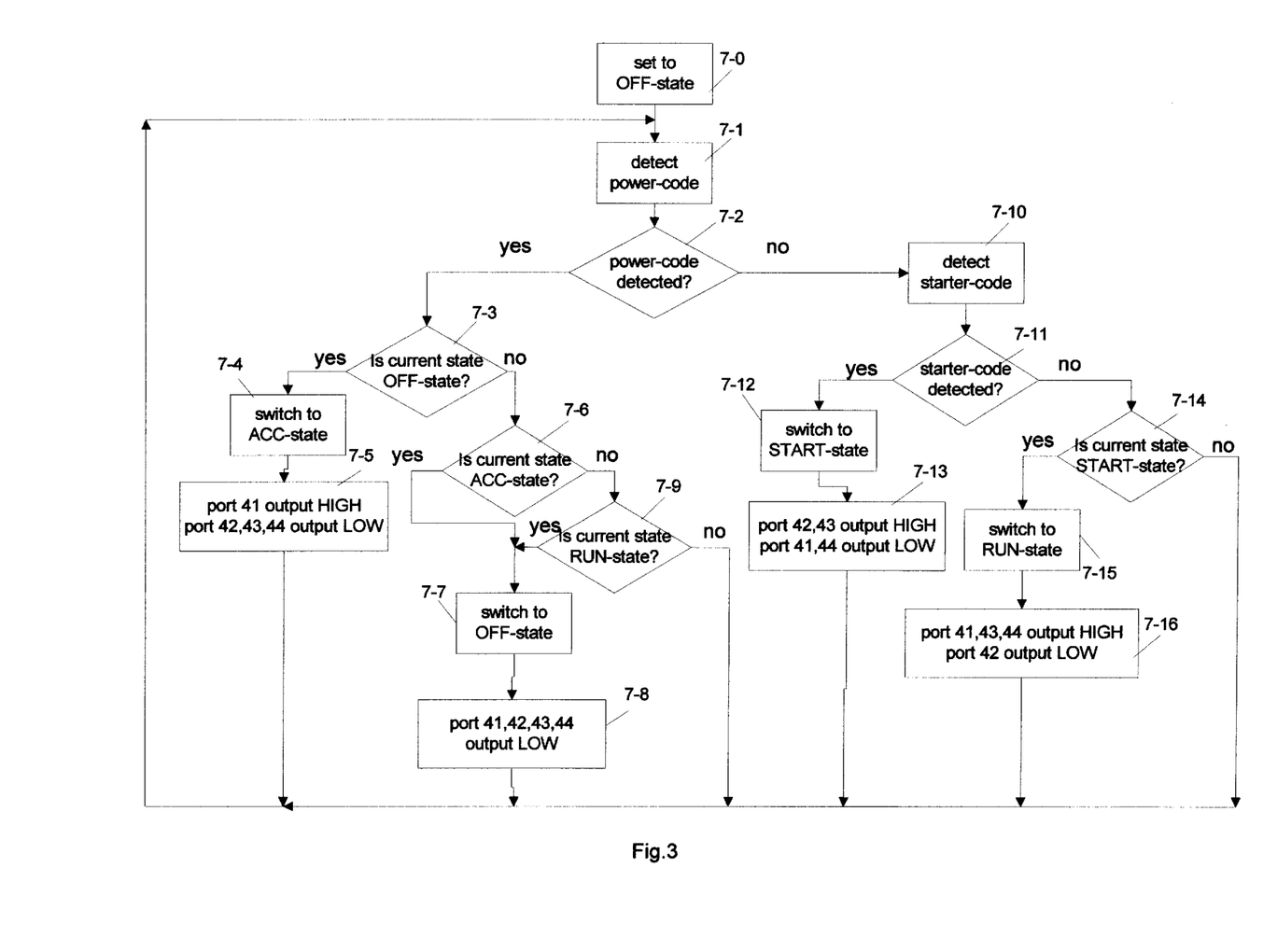
FIG. 3 illustrates a logic flow chart of the software loaded into the receiver IC chip to implement the functions of detecting the power-code and the starter-code, generating output signals to control the ACC-circuit switch, the starting-circuit switch, the first ignition-circuit switch and the second ignition-circuit switch, and maintaining a state-machine with the OFF-state, the ACC-state, the START-state and the RUN-state.

FIG. 3 illustrates a logic flow chart of the software loaded into the receiver IC chip 3 to implement the functions of detecting the power-code and the starter-code, generating output signals to control the ACC-circuit switch, the starting-circuit switch, the first ignition-circuit switch and the second ignition-circuit switch, and maintaining a state-machine with the OFF-state, the ACC-state, the START-state and the RUN-state. The software implements a process to perform these tasks. Starting from the beginning of the process, an initial state of the OFF-state is set at step 7-0. Then the receiver IC chip tries to detect the power-code transmitted from the portable wireless transmitter 100 at step 7-1. At step 7-2 it is checked whether the power-code is detected or not. If it is found at step 7-2 that the power-code is detected, then it is checked at step 7-3 whether the current state is the OFF-state. If it is found at step 7-3 that the current state is the OFF-state, the state of the receiver IC chip 3 is switched to the ACC-state at step 7-4, and the port 41 outputs a high voltage and the ports 42, 43 and 44 output low voltages at step 7-5. If it is found at step 7-3 that the current state is not the OFF-state, then it is checked at step 7-6 whether the current state is the ACC-state. If it is found at step 7-6 that the current state is the ACC-state, the state of the receiver IC chip 3 is switched to the OFF-state at step 7-7, and the ports 41, 42, 43 and 44 output low voltages at step 7-8. If it is found at step 7-6 that the current state is not the ACC-state, then it is checked at step 7-9 whether the current state is the RUN-state. If it is found at step 7-9 that the current state is the RUN-state, the state of the receiver IC chip 3 is switched to the OFF-state at step 7-7, and the ports 41, 42, 43 and 44 output low voltages at step 7-8. If it is found at step 7-9 that the current state is not the RUN-state, the receiver IC chip 3 goes back to step 7-1 to start another cycle of the process. If it is found at step 7-2 that the power-code is not detected, then the receiver IC chip tries to detect the starter-code at step 7-10. At step 7-11 it is checked whether the starter-code is detected or not. If it is found at step 7-11 that the starter-code is detected, then the state of the receiver IC chip 3 is switched to the START-state at step 7-12, and the ports 42 and 43 output high voltages and the ports 41 and 44 output low voltages at step 7-13. If it is found at step 7-11 that the starter-code is not detected, then it is checked at step 7-14 whether the current state of the receiver IC chip 3 is the START-state. If it is found at step 7-14 that the current state is the START-state, the state of the receiver IC chip 3 is switched to the RUN-state at step 7-15 and the ports 41, 43 and 44 output high voltages and the port 42 outputs a low voltage at step 7-16. If it is found at step 7-14 that the current state is not the START-state, the receiver IC chip 3 goes back to astep 7-1 to start another cycle of the process. After completing the tasks at steps 7-5, 7-8, 7-13 or 7-16, the transmitter IC chip 2 goes back to step 7-1 and starts another cycle of the process.

Figure 4:
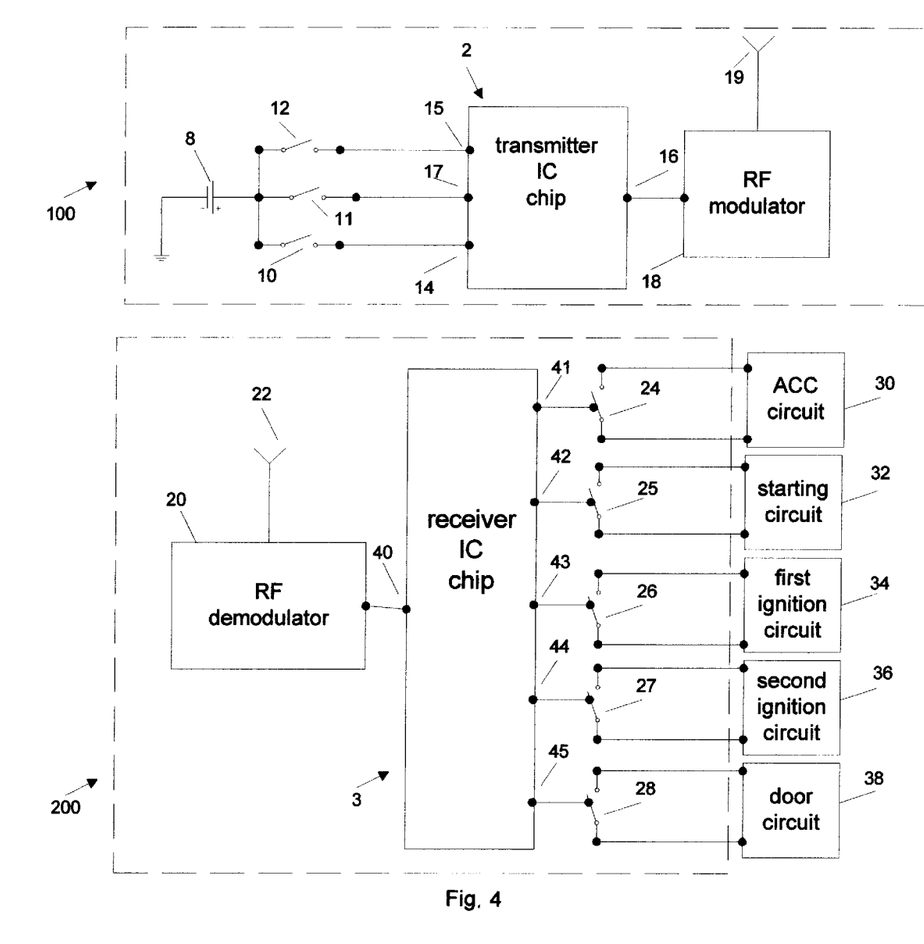
FIG. 4 illustrates an implementation of the keyless starting system with a keyless door-opening feature.

FIG. 4 illustrates an implementation of the keyless starting system with a keyless door-opening feature. The circuit in FIG. 4 is the same as the circuit in FIG. 1 except that a door-code switch 11 is added between the battery 8 and the transmitter IC chip 2 and an output port 45 on the receiver IC chip 3 is connected to a door-circuit switch 28 controlling a vehicle door circuit 38. The software loaded into the transmitter IC chip 2 implements a process with functions described in FIG. 2 and a function of generating a door-code, depending on which switch on the wireless transmitter board 100 is pressed. The software loaded into the receiver IC chip 3 implements a process with functions described in FIG. 3 and a function of detecting a door-code and outputting a high voltage to the port 45 if the door-code is detected.

The operation of the keyless starting system is described as follows.

To turn on or off the power supply of the motor vehicle, press momentarily the power-code switch 10 on the portable wireless transmitter. Then the power-code is generated by the transmitter IC chip 2 and modulates an RF signal through the RF modulator 18 and is transmitted to the air by the antenna 19. The RF signal is received by the antenna 22 on the receiver/controller board and is demodulated by the RF demodulator 20 and is converted back to the power-code generated by the transmitter IC chip 2. The receiver IC chip then detects the power-code and sends appropriate high or low voltages to the switches 24, 25, 26 and 27 to turn on or off the power supply of the motor vehicle.

To start the vehicle, press and hold the starter-code switch 12 on the portable wireless transmitter. Then a starter-code is generated by the transmitter IC chip 2 and modulates an RF signal through the RF modulator 18 and is transmitted to the air. The RF signal is received by the antenna 22 and is demodulated by the RF demodulator 20 and is converted back to the starter-code generated by the transmitter IC chip 2. The receiver IC chip 3 then detects the starter-code and sends appropriate high or low voltages to the switches 24, 25, 26 and 27 to turn on the starter. Once the engine of the motor vehicle is started, the starter-code switch 12 is released. Then the engine of the motor vehicle starts to run.

To stall the vehicle, press momentarily the power switch 10 on the portable wireless transmitter. Then the power-code is generated by the transmitter IC chip 2 and modulates an RF signal through the RF modulator 18 and is transmitted to the air by the antenna 19. The RF signal is received by the antenna 22 on the receiver/controller board and is demodulated by the RF demodulator 20 and is converted back to the power-code generated by the transmitter IC chip 2. The receiver IC chip 3 then detects the power-code and sends low voltages to the switches 24, 25, 26 and 27 to turn off the engine.

The design of the electronic circuits for the RF modulator 18 and the RF demodulator 20 can be found in *Digital Communications*, McGraw-Hill, 2nd edition, 1989, by J. G. Proakis, *Engineering Electronics*, Prentice-Hall, 1989, by R. Mauro and *Electromagnetic Concepts and applications*, Prentice-Hall, 2nd edition, 1987, by S. V. Marshall and G. Skitek.

While considerable emphasis has been herein on the preferred embodiment illustrated and described hereinabove, it will be appreciated that other embodiments of the invention can be made and that changes can be made in the preferred embodiment without departing from the principals of the present invention. Accordingly, it is to be distinctly understood that the foregoing descriptive matter is to be interpreted merely as illustrative of the invention and not as a limitation.

What is claimed is:

1. A keyless motor vehicle starting system comprising:
   an ACC-circuit;
   a starting circuit;
   an ignition circuit;
   a portable wireless transmitter which comprises:
   (a) a power-code switch;
   (b) a starter-code switch;
   (c) a transmitter integrated-circuit chip which has an output port, has a first input port connected to said power-code switch, has a second input port connected to said starter-code switch, and is programmed with a computer program implementing a process to generate a power-code when said power-code switch is pressed and to generate a starter-code when said starter-code switch is pressed;
   (d) an electromagnetic-wave modulator which is connected to said output port of said transmitter integrated-circuit chip and generates an electromagnetic-wave signal modulated by said power-code or said starter-code generated by said transmitter integrated-circuit chip;
   (e) an electromagnetic-wave transmitting means connected to said electromagnetic-wave modulator;
   a receiver/controller board which comprises:
   (a) an electromagnetic-wave receiving means which generates a received electromagnetic-wave signal;
   (b) an electromagnetic-wave demodulator connected to said electromagnetic-wave receiving means;
   (c) an ACC-circuit switch controlling said ACC-circuit,
   (d) a starting-circuit switch controlling said starting-circuit;
   (e) an ignition-circuit switch controlling said ignition-circuit;
   (f) a receiver integrated-circuit chip connected to said electromagnetic-wave demodulator and programmed with a computer program implementing a process to detect said power-code and said starter-code and to generate output signals controlling said ACC-circuit switch, said starting-circuit switch and said ignition-circuit switches;
   wherein said portable wireless transmitter and said receiver/controller board are used to replace an ignition lock, an ignition key and an ignition switch in a conventional motor vehicle.

2. The keyless motor vehicle starting system as defined in claim 1 wherein:
   said transmitter integrated-circuit chip is programmed with a computer program implementing a process comprising the steps of:
   2-1) checking whether the input at said first input port is a high voltage,
   2-2) checking whether the input at said second input port is a high voltage,
   2-3) outputting all 0's at said output port if the input at said first input port at step 2-1 is a high voltage and the input at said second input port at step 2-2 is a high voltage, 2-4) outputting all 0's at said output port if the input at said first input port at step 2-1 is a low voltage and the input at said second input port at step 2-2 is a low voltage, 2-5) outputting said power-code at said output port if the input at said first input port at step 2-1 is a high voltage and the input at said second input port at step 2-2 is a low voltage, 2-6) outputting said starter-code at said output port if the input at said first input port at step 2-1 is a low voltage and the input at said second input port at step 2-2 is a high voltage, 2-7) going back to step 2-1.

3. The keyless motor vehicle starting system as defined in claim 1 wherein:

said receiver integrated-circuit chip has an input port connected to said electromagnetic-wave demodulator, a first output port connected to said ACC-circuit switch, a second output port connected to said starting-circuit switch, a third output port connected to said ignition switch.

4. The keyless motor vehicle starting system as defined in claim 3 wherein:

said receiver integrated-circuit chip has an OFF-state when said first output port, said second output port and said third output port output low voltages;

said receiver integrated-circuit chip has an ACC-state when said first output port outputs a high voltage, and said second output port and said third output port output low voltages;

said receiver integrated-circuit chip has a START-state when said second output port and said third output port output high voltages and said first output port outputs a low voltage, said receiver integrated-circuit chip has a RUN-state when said first output port and said third output port output high voltages and said second output port outputs a low voltage.

5. The keyless motor vehicle starting system as defined in claim 4 wherein:

said receiver integrated-circuit chip is programmed with a computer program implementing a process comprising the steps of:

5-1) detecting said power-code, 5-2) checking whether said power-code is detected at step 5-1, 5-3) switching the state of said receiver integrated-circuit chip to said ACC-state if said power-code is detected at step 5-2 and the current state of said receiver integrated-circuit chip is said OFF-state, 5-4) outputting a high voltage at said first output port and outputting low voltages at said second output port, said third output port and said forth output port if the state of said receiver integrated-circuit chip is switched to said ACC-state at step 5-3, 5-5) switching the state of said receiver integrated-circuit chip to said OFF-state if said power-code is detected at step 5-2 and the current state of said receiver integrated-circuit chip is said ACC-state, 5-6) outputting low voltages at said first output port, said second output port and said third output port if the state of said receiver integrated-circuit chip is switched to said OFF-state at step 5-5, 5-7) switching the state of said receiver integrated-circuit chip to said OFF-state if said power-code is detected at step 5-2 and the current state of said receiver integrated-circuit chip is said RUN-state, 5-8) outputting low voltages at said first output port, said second output port and said third output port if the state of said receiver integrated-circuit chip is switched to said OFF-state at step 5-7, 5-9) detecting said starter-code, 5-10) checking whether said starter-code is detected at step 5-9, 5-11) switching the state of said receiver integrated-circuit chip to said START-state if said starter-code is detected at step 5-10, 5-12) outputting high voltages at said second output port and said third output port and outputting a low voltage at said first output port if the state of said receiver integrated-circuit chip is switched to said START-state at step 5-11, 5-13) switching the state of said receiver integrated-circuit chip to said RUNstate if said power-code is not detected at step 5-2 and said starter-code is not detected at step 5-10 and the current state of said receiver integrated-circuit chip is said START-state, 5-14) outputting high voltages at said first output port and said third output port and outputting a low voltage at said second output port if the state of said receiver integrated-circuit chip is switched to said RUN-state at step 5-13, 5-15) going back to step 5-1.

6. The keyless motor vehicle starting system as defined in claim 1 wherein:

a door-code switch is connected to said transmitter integrated-circuit chip and said transmitter integrated-circuit chip generates a door-code when said door-code switch is pressed.

7. The keyless motor vehicle starting system as defined in claim 6 wherein:

said keyless motor vehicle starting system has a door-circuit;

said receiver/controller board has a door-circuit switch controlling said door-circuit;

said receiver integrated-circuit chip has an output port connected to said door-circuit switch.

8. The keyless motor vehicle starting system as defined in claim 7 wherein:

said receiver integrated-circuit chip outputs a high voltage to control said door-circuit switch when said door-code is detected by said receiver integrated-circuit chip;

said receiver integrated-circuit chip outputs a low voltage to control said door-circuit switch when said door-code is not detected by said receiver integrated-circuit chip.

9. The keyless motor vehicle starting system as defined in claim 6 wherein:

said door-code switch is a normal-off push-button switch and turns on the function of generating said door-code when said door-code switch is pressed.

10. The keyless motor vehicle starting system as defined in claim 1 wherein:

said power-code switch is a normal-off push-button switch and turns on the function of generating said power-code when said power-code switch is pressed;

said starter-code switch is a normal-off push-button switch and turns on the function of generating said starter-code when said starter-code switch is pressed.

11. The keyless motor vehicle starting system as defined in claim 1 wherein:

said power-code is a series of 0 and 1's which are encoded according to a first rule;

said starter-code is a series of 0 and 1's which are encoded according a second rule.

12. The keyless motor vehicle starting system as defined in claim 6 wherein:

said door-code is a series of 0 and 1's which are encoded according to a third rule.

13. The keyless motor vehicle starting system as defined in claim 1 wherein:

said electromagnetic-wave demodulator demodulates said received electromagnetic-wave signal received by said electromagnetic-wave receiving means and generates a demodulated signal;

said demodulated signal is fed into said receiver integrated-circuit chip.

14. The keyless motor vehicle starting system as defined in claim 1 wherein:

said electromagnetic-wave modulator is a radio frequency modulator;

said electromagnetic-wave demodulator is a radio frequency demodulator.

15. The keyless motor vehicle starting system as defined in claim 1 wherein:

said electromagnetic-wave transmitting means is a transmitting antenna;

said electromagnetic-wave receiving means is a receiving antenna.

* * * * *